No. 612,233. Patented Oct. 11, 1898.
C. F. COX.
GLASS MELTING FURNACE.
(Application filed Oct. 20, 1897.)
(No Model.) 3 Sheets—Sheet 1.
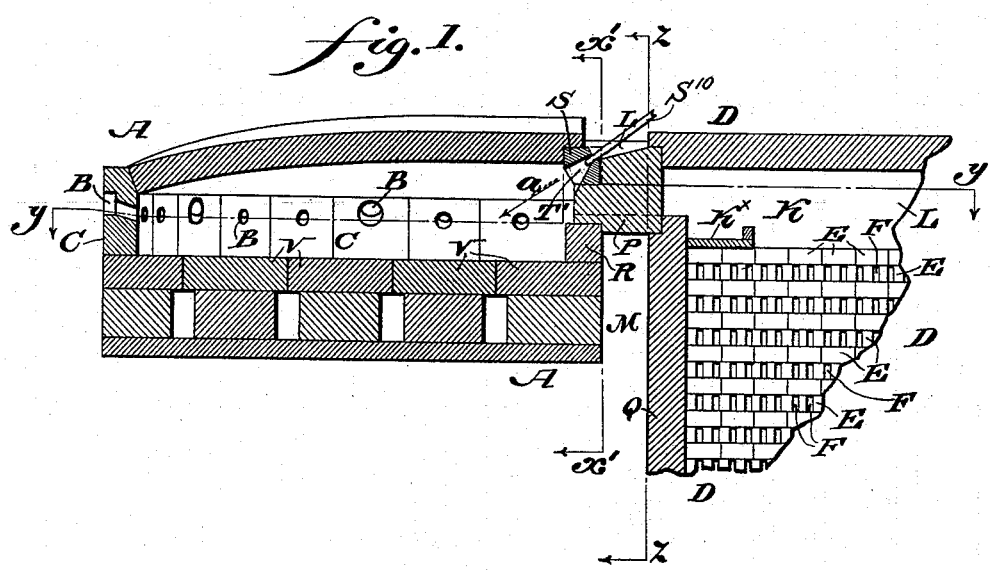
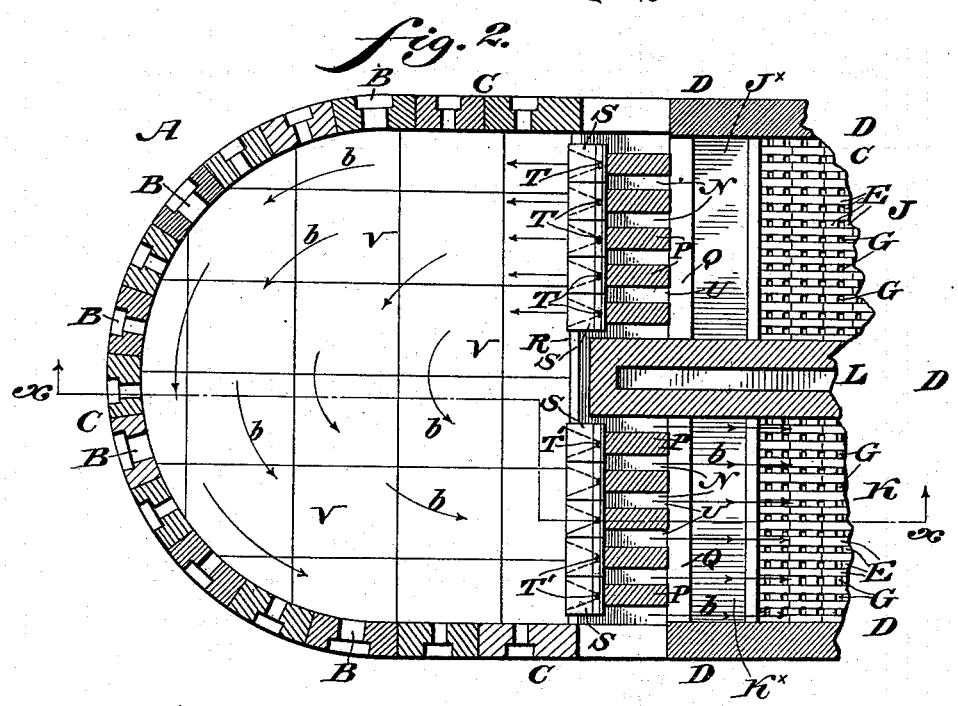
WITNESSES
L. Douville,
P. H. Aragle.
INVENTOR
Charles F. Cox.
BY
Wiedersheim & Fairbanks
ATTORNEYS
THE NORRIS PETERS CO., PHOTO-LITHO., WASHINGTON, D. C.

No. 612,233. Patented Oct. 11, 1898.
C. F. COX.
GLASS MELTING FURNACE.
(Application filed Oct. 20, 1897.)
(No Model.) 3 Sheets—Sheet 2.
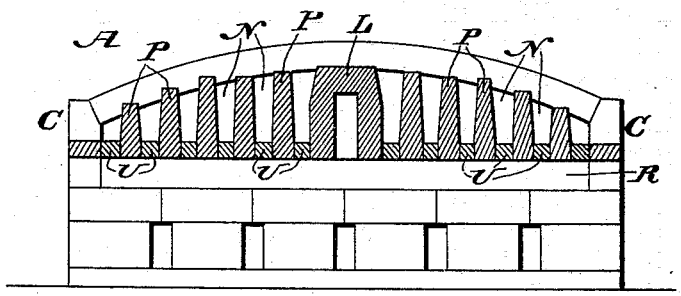
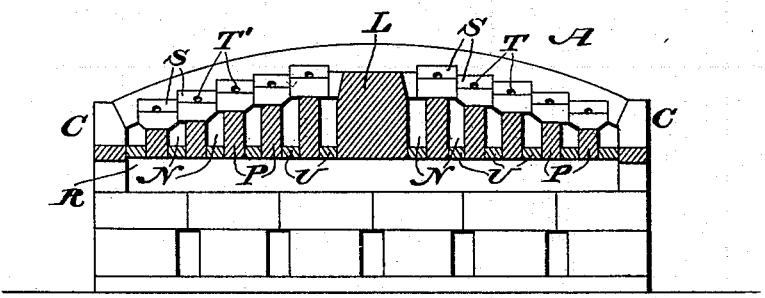

No. 612,233. Patented Oct. 11, 1898.
C. F. COX.
GLASS MELTING FURNACE.
(Application filed Oct. 20, 1897.)
(No Model.) 3 Sheets—Sheet 3.
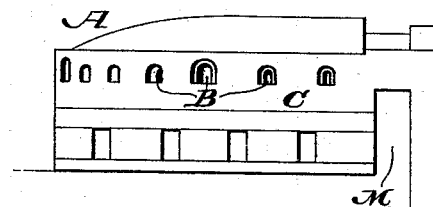
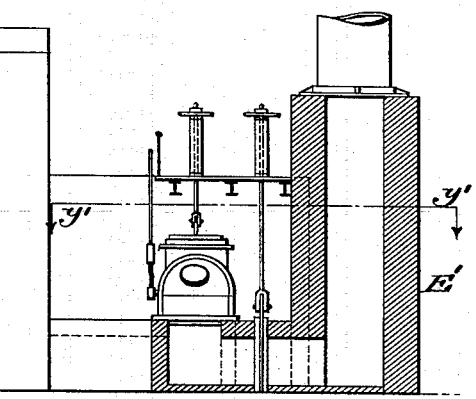
Fig. 5.
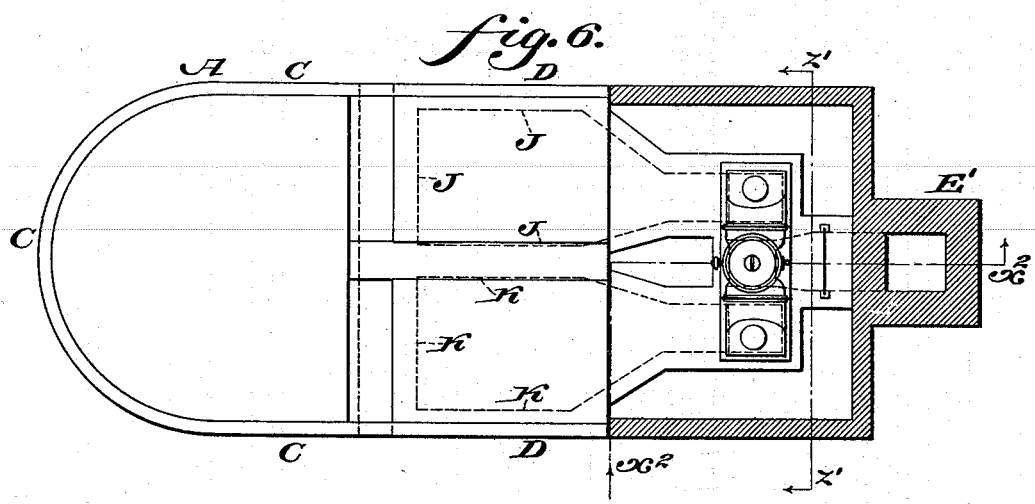
Fig. 6.
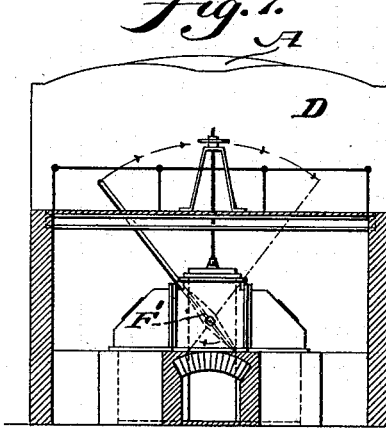
Fig. 7.
WITNESSES:
L. Douville,
P. F. Cragke.
INVENTOR
Charles F. Cox,
BY Diedersheim & Fairbanks
ATTORNEYS

UNITED STATES PATENT OFFICE.

CHARLES F. COX, OF BRIDGETON, NEW JERSEY.

GLASS-MELTING FURNACE.

SPECIFICATION forming part of Letters Patent No. 612,233, dated October 11, 1898.

Application filed October 20, 1897. Serial No. 655,779. (No model.)

*To all whom it may concern:*

Be it known that I, CHARLES F. COX, a citizen of the United States, residing at Bridgeton, in the county of Cumberland, State of New Jersey, have invented a new and useful Improvement in Glass-Melting Furnaces, which improvement is fully set forth in the following specification and accompanying drawings.

My present invention relates to a novel construction of furnace known as a "tank-furnace;" and to this end my improvements are, first, to effect a gradual and uniform settling or cooling of the glass; second, to use the sides of the tank for working-out holes; third, to give a circular sweep to the flame or gases, keeping the exterior of furnace cool and render the sides available for working-out holes; fourth, using a liquid or hydrocarbon or natural gas as a fuel and having in the passages leading to and from the regenerators clay walls running parallel to said passages and on the front or tank end of which are placed clay blocks, brick, or other refractory material forming ports for the admittance of hydrocarbon, liquid fuel, or natural gas; fifth, using clay block, brick, or other refractory material in a wall running parallel to the passages and forming ports to conduct a uniform supply of hot air from regenerators to support combustion and to prevent a too free escape of the heat in the tank proper, the latter having formerly been a cause of much trouble and annoyance in furnaces of this class; sixth, having ports for the admittance of hydrocarbon, liquid fuel, or natural gas in the caps of passage-ways leading to and from regenerators, formed of clay or other refractory material, the fuel entering these ports uniting with the hot air entering through ports in the passage-ways and creating the intensely-high temperature which is necessary in making flint-glass; seventh, using clay blocks or other refractory material of peculiar shape, forming ports in the caps of the passage-ways leading to and from regenerators, said blocks forming parts of caps and the bottom or under side of which rests on the port-walls formed in passage-ways leading to and from the regenerators, thus forming a complete and substantial arrangement for the proper mixing of the hydrocarbon or natural gas fuel and hot air entering through ports or passage-ways to create the necessary high temperature; and eighth, to prevent the dust or particles of batch which follow the hot-air currents or drafts from settling on or passing through regenerators by forming at the front end of the regenerators a pocket of clay or other refractory material, the dust or particles falling into this pocket and being there to some extent melted, the particles so deposited being then prevented from passing downward into the checker-work, which latter is thus kept clean and free from choking.

It further consists of novel details of construction, all as will be hereinafter fully set forth, and particularly pointed out in the claims.

Figure 1 represents a longitudinal vertical section of a portion of a glass-melting furnace embodying my invention, the section being taken on line $x\ x$, Fig. 2. Fig. 2 represents a horizontal section of the portion of the furnace shown in Fig. 1, the section being taken on line $y\ y$, Fig. 1. Fig. 3 represents a partial end elevation and partial vertical section of a detached portion of the furnace shown in Fig. 1, the section being taken on line $z\ z$, Fig. 1. Fig. 4 represents a partial end elevation and partial vertical section of a detached portion of the furnace shown in Fig. 1, the section being taken on line $x'\ x'$, Fig. 1. Fig. 5 represents a partial side elevation and partial vertical section of a glass-melting furnace embodying my invention. The same is on a reduced scale and the section is taken on line $x^2\ x^2$, Fig. 6. Fig. 6 represents a partial plan view and partial horizontal section of the furnace shown in Fig. 5, the section being taken on line $y'\ y'$, Fig. 5. Fig. 7 represents a partial end elevation and partial vertical section of the furnace shown in Figs. 5 and 6, the section being taken on line $z'\ z'$, Fig. 6.

Similar letters of reference indicate corresponding parts in the figures.

Referring to the drawings, A designates a melting furnace or tank within which is placed any suitable material, which when melted is converted into glass, said material being placed in the furnace A through the openings B in the sides C thereof, the latter being in the present instance of circular contour.

D designates the regenerative portion of the furnace A, the former being supplied with blocks E of refractory material, said blocks being so placed relatively to each other that passages F and G exist between them, the passages F running in a horizontal direction and the passages G in a vertical one, it being apparent that by thus arranging said blocks E the products of combustion generated in the furnace A will pass through said passages F and G, and thereby intensely heat the blocks E on their way to the smoke-stack E'. (See Figs. 5 and 6.)

The regenerative portion D of the furnace consists in the present instance of two chambers J and K, as seen in Fig. 2, separated from each other by the wall or partition L.

The furnace A is separated from the regenerative portion D thereof by a space M, (see Figs. 1 and 5,) and communication between the furnace A and regenerative portion D is effected through the apertures, openings, or passages N, which exist between the blocks or partitions P, which rest partly on the wall Q of the regenerative portion D and partly on the wall R of the melting-furnace A, as best seen in Fig. 1. When the blocks are burned out, they may be readily removed and replaced by fresh ones, the blocks when in position partly or entirely closing the tops of said passages N and lying adjacent to each other and located between the caps of the working chamber A and the regenerator D.

The blocks P in the present instance support the blocks S, which constitute upward extensions of said partitions P and serve as closures for the tops of the passages N, each block being provided with an opening or port T or T', through which latter is directed the flame, as indicated by the arrow $a$ in Fig. 1, the same being derived from a hydrocarbon, natural-gas, or other burner, it being noticed that the inner end of said ports T T' are directly over the outlet ends of the passages into the tank, so that gas is injected directly against the hot air in the tank, so that the gas and air immediately intermingle in the tank, causing a perfect combustion of the resultant gas therein.

It will be evident that if desired the blocks P and S may be made in one piece and that any suitable liquid or natural-gas fuel may be employed for melting the material placed in said furnace A, so as to convert the same into glass.

The ports T or T' alternate with the passages N, so that two volumes of hot air are directed to the gas, one volume on each side thereof, whereby the gas is greatly supplied with hot air, the advantage of which is evident.

The spaces between the lower portions of the blocks P are closed by the blocks U, as best seen in Figs. 3 and 4.

The chambers J and K are each provided with a pocket or trough $J^\times$ and $K^\times$, respectively, of a refractory material which catch the dust and particles of batch drawn into said chambers by the products of combustion and prevent the same from reaching the blocks E and passages F and G between the same, the dust or particles of batch which are caught by the troughs $J^\times$ and $K^\times$ being to some extent melted by the heat which passes over the same.

The operation is as follows: The material to be melted and converted into glass is fed to the melting-furnace A through the openings B, said material being supported on the slabs V, which form the floor of said furnace. A Siemens valve F', of usual construction, (see Fig. 7,) which may open and close the communication between the smoke-stack E' and either of the chambers J or K, is so adjusted as to close the communication between the chamber J and said stack, and thereby locating said valve F' in such a position that a communication exists between the furnace A and said stack through the chamber K. The hydrocarbon, natural-gas, or other burners or heating devices which are employed in connection with the openings T in the block S, that are located between the furnace A and chamber J, are ignited and direct their flame into the furnace A, and the products of combustion follow the direction indicated by the arrows $b$ in Fig. 2 and pass through the passages N and over $K^\times$ and down through the passages F and G between the blocks E in the chamber K and in so doing heat to an intensely-high degree said blocks E, after which said products of combustion reach the smoke-stack E', hereinbefore referred to, and are directed by the same to the atmosphere. At the proper time the burners employed in connection with the openings T are extinguished and another set, which are directed through the openings T', are started, the valve F', hereinbefore referred to, being meanwhile so placed that the communication between the furnace A and chamber K is cut off from the smoke-stack, and the valve F', in its present position, now establishes a communication between the furnace A, the chamber J, and said smoke-stack E', and the products of combustion flow in a direction opposite to that indicated by the arrows $b$ in Fig. 2 and pass through the openings N between the blocks P, employed in connection with the chamber J and through the passages F and G between the blocks E in said chamber, and from the latter to the stack E', and finally into the open air. The heat from the blocks E in the chamber K is drawn through the openings N employed in connection with said chamber by the current produced by the suction of the smoke-stack E', and said heat communicates and commingles with the flames from the hydrocarbon or other burners and promotes combustion and intensifies the heat in the furnace A. The products of combustion in passing between the blocks E in the chamber J heat the same, so that said heat may be employed at a proper time to intensify the heat in the furnace A. It will be apparent that the heat absorbed by the blocks E from the products of combustion is utilized to promote combustion in the furnace A, it being also apparent that if said blocks E were not employed the greater portion of the heat units in the products of combustion would be lost, as the same would have a direct passage from the furnace A to the smoke-stack E'. When the material to be converted into glass and which has been placed in the furnace A is reduced to a liquid state, the hydrocarbon or other burners are regulated according to the degree of heat at which it is desired to keep the furnace, and the glass is removed and new material placed in the furnace. When the molten glass has been removed from the furnace A, the valve F', hereinbefore referred to, is so placed that a communication is again established between the furnace A and the stack E', so that the blocks E in the chamber J may again be heated by the products of combustion from the furnace A, it being noted that the chambers J and K are employed alternately for heating the blocks E therein, so that the heat from said blocks may be utilized to promote the combustion and intensify the heat in the furnace A.

Having thus described my invention, what I claim as new, and desire to secure by Letters Patent, is—

1. The combination of a working chamber, an air-regenerator adjacent thereto, an opening between said chamber and regenerator, said opening being subdivided into a series of air-passages by parallel partitions, a series of removable apertured blocks lying adjacent to each other upon the tops of said partitions and closing said passages and fuel-burners at the apertures of said blocks.

2. In a glass-melting furnace, the combination of a tank and a regenerative chamber having their adjacent walls separated by an air-space, partitions on said walls forming communicating passages between said tank and chamber, blocks on said partitions having ports therein leading from without the tank to said passages, and means for supplying hydrocarbon or other liquid fuel or natural gas to said ports, both passages and ports terminating adjacent to each other in said tank.

3. In a glass-melting furnace, the combination of a tank, separate and distinct regenerative chambers, ports connecting said chambers with said tank, ports opening into said tank and provided with means for introducing hydrocarbon or natural-gas fuel therein, troughs located in said regenerative chambers below the connecting-ports, a smoke-stack communicating with said regenerative chambers, and a valve mechanism controlling the communications between said stack and said chambers.

4. In a glass-melting furnace, the combination of a tank, separate and distinct regenerative chambers, a series of ports connecting each chamber with said tank, a series of ports opening into said tank, above said connecting-ports provided with means for introducing hydrocarbon or natural-gas fuel into the said tank, a trough located in each regenerative chamber below the connecting-ports, a smoke-stack communicating with said regenerative chambers, and a valve mechanism controlling the communications between said chambers and said stack for connecting either of said chambers with said stack.

5. In a regenerative tank-furnace for the melting of glass, a tank, the latter having working-out or feeding doors in a side thereof, a series of regenerators located in proximity to said tank, passages common to said regenerators and tank, ports opening directly into said tank and located above said passages for the admission of a hydrocarbon or other fluid or natural-gas heating medium to the tank and troughs or pockets located above said regenerators in proximity to said passages.

6. In a regenerative tank-furnace for the melting of glass, a tank having working-out or feeding doors in the sides thereof, a plurality of regenerators located in proximity to said tank, troughs located above said regenerators, communicating passages common to said tank and regenerators, ports located above said passages and discharging directly into said tank and means for imparting a curved direction to the flame and hot gases within said tank alternately.

7. In a glass-melting furnace, the combination of a tank, separate and distinct regenerative chambers, ports connecting said chambers with said tank, troughs located in said generative chambers below the connecting-ports, a smoke-stack communicating with said regenerative chambers, and a valve mechanism controlling the communications between said stack and said chambers.

8. The combination of a working chamber, an air-regenerator adjacent thereto, an opening between said chamber and regenerator, said opening being subdivided into a series of air-passages by parallel partitions, a series of removable apertured blocks lying adjacent to each other upon the tops of said partitions and closing said passages and fuel-burners at the apertures of said blocks, said apertures alternating with said air-passages.

9. The combination of a working chamber, an air-regenerator adjacent thereto, said chamber and regenerator being provided with caps, an opening between said chamber and regenerator, said opening being subdivided into a series of air-passages by parallel partitions, a series of removable apertured blocks lying adjacent to each other upon the tops of said partitions and closing said passages, and fuel-burners at the aperture of said blocks, said apertures alternating with said air-passages and said blocks being located between the caps of said working chamber and regenerator.

CHAS. F. COX.

Witnesses:
EDWIN R. LANING,
WALTER H. BACON.